US007886343B2

(12) United States Patent
Sullivan et al.

(10) Patent No.: US 7,886,343 B2
(45) Date of Patent: Feb. 8, 2011

(54) AUTHENTICATION SERVICE FOR FACILITATING ACCESS TO SERVICES

(75) Inventors: Timothy Sullivan, Portola Valley, CA (US); Timothy C. Nichols, Los Altos, CA (US); Timothy Bucher, Mountain View, CA (US); John S. Evans, Mountain View, CA (US)

(73) Assignee: Dell Products L.P., Round Rock, TX (US)

( * ) Notice: Subject to any disclaimer, the term of this patent is extended or adjusted under 35 U.S.C. 154(b) by 84 days.

(21) Appl. No.: 11/697,635

(22) Filed: Apr. 6, 2007

(65) Prior Publication Data

US 2007/0240202 A1    Oct. 11, 2007

Related U.S. Application Data

(60) Provisional application No. 60/790,246, filed on Apr. 7, 2006.

(51) Int. Cl.
*G06F 7/04* (2006.01)
*G06F 15/16* (2006.01)
*G06F 17/30* (2006.01)
*H04L 29/06* (2006.01)

(52) U.S. Cl. .......................................... 726/5; 713/153
(58) Field of Classification Search .................... 726/5, 726/9, 11, 7, 6; 713/153, 152
See application file for complete search history.

(56) References Cited

U.S. PATENT DOCUMENTS

| 5,983,350 | A | * | 11/1999 | Minear et al. ................ 726/11 |
| 6,363,365 | B1 | * | 3/2002 | Kou ............................ 705/64 |
| 6,421,714 | B1 | * | 7/2002 | Rai et al. ..................... 709/217 |
| 6,636,897 | B1 | * | 10/2003 | Sherman et al. .............. 709/248 |
| 6,862,444 | B2 | * | 3/2005 | Karaoguz et al. ............ 455/408 |
| 7,124,300 | B1 | * | 10/2006 | Lemke ........................ 713/186 |
| 7,283,820 | B2 | * | 10/2007 | Kamijo et al. .............. 455/435.1 |
| 7,340,261 | B2 | * | 3/2008 | Walter ........................ 455/456.2 |
| 7,568,621 | B2 | * | 8/2009 | von Mueller et al. ......... 235/449 |
| 2001/0056487 | A1 | * | 12/2001 | Yoo ............................ 709/225 |
| 2002/0087892 | A1 | * | 7/2002 | Imazu ........................ 713/202 |
| 2003/0105887 | A1 | * | 6/2003 | Cox et al. ................... 709/328 |
| 2003/0163701 | A1 | * | 8/2003 | Ochi et al. .................. 713/175 |
| 2003/0195884 | A1 | * | 10/2003 | Boyd et al. ..................... 707/7 |
| 2004/0122959 | A1 | * | 6/2004 | Lortz .......................... 709/229 |
| 2004/0172559 | A1 | * | 9/2004 | Luo et al. .................... 713/201 |
| 2004/0199472 | A1 | * | 10/2004 | Dobbins ........................ 705/50 |
| 2004/0230807 | A1 | * | 11/2004 | Baird et al. .................. 713/182 |

(Continued)

*Primary Examiner*—David García Cervetti
(74) *Attorney, Agent, or Firm*—Workman Nydegger (57) ABSTRACT

Authenticating a third party client system prior to providing Internet access via an Internet access point. In a distributed computing system including an Internet access point, an authentication service, and a third party client system, an authentication service receives an authorization request from a third party client system. The authorization request is initiated in response to a single action being performed by a user of the third party client system. The user is not required to manually submit any identification information. The authorization request includes a unique client identifier for identifying the third party client system. The method also includes verifying that the third party client system associated with the unique client identifier is authorized to access the Internet via the Internet access point. If the third party client system is authorized to access the Internet, Internet access is provided to the third party client system.

20 Claims, 5 Drawing Sheets

U.S. PATENT DOCUMENTS

| | | | |
|---|---|---|---|
| 2005/0018624 A1* | 1/2005 | Meier et al. | 370/318 |
| 2005/0021975 A1* | 1/2005 | Liu | 713/182 |
| 2005/0048950 A1* | 3/2005 | Morper | 455/410 |
| 2005/0059396 A1* | 3/2005 | Chuah et al. | 455/435.1 |
| 2005/0157753 A1* | 7/2005 | Mayer | 370/468 |
| 2005/0223086 A1* | 10/2005 | Raverdy et al. | 709/220 |
| 2005/0223392 A1* | 10/2005 | Cox et al. | 719/328 |
| 2006/0049255 A1* | 3/2006 | von Mueller et al. | 235/449 |
| 2006/0049256 A1* | 3/2006 | von Mueller et al. | 235/449 |
| 2006/0059359 A1* | 3/2006 | Reasor et al. | 713/182 |
| 2006/0068785 A1* | 3/2006 | Kamijo et al. | 455/435.1 |
| 2007/0011724 A1* | 1/2007 | Gonzalez et al. | 726/4 |
| 2007/0016941 A1* | 1/2007 | Gonzalez et al. | 726/9 |
| 2007/0204016 A1* | 8/2007 | Kunz et al. | 709/223 |
| 2007/0204037 A1* | 8/2007 | Kunz et al. | 709/225 |
| 2007/0214356 A1* | 9/2007 | Song et al. | 713/156 |
| 2008/0034410 A1* | 2/2008 | Udupa et al. | 726/5 |
| 2008/0077592 A1* | 3/2008 | Brodie et al. | 707/9 |

\* cited by examiner

AUTHENTICATION SERVICE FOR FACILITATING ACCESS TO SERVICES

CROSS-REFERENCE TO RELATED APPLICATIONS

This application claims the benefit of U.S. Provisional Patent Application Ser. No. 60/790,246 filed Apr. 7, 2006, which application is incorporated herein by reference in its entirety.

BACKGROUND OF THE INVENTION

1. The Field of the Invention

The present invention relates generally to accessing the Internet via an Internet access point. More specifically, the present invention relates to methods and systems for authenticating a client system with an Internet access point.

2. The Relevant Technology

Recently, accessing Internet via a wireless link has become increasingly common and Internet users are growing to expect wireless Internet access in many different areas, including both public and private locations. For example, many users carry a laptop or other mobile Internet-ready devices to local coffee shops, public libraries, city centers, cyber cafes, public transportation, airports, among other locations, and expect to have wireless Internet access upon their arrival.

Therefore, many of the above locations offer Internet access to the public and provide Internet access points which allow third party client systems to connect to the Internet. The Internet access points may include wireless and wired routers, switches, Wireless Access Points (WAPs), and the like, which are capable of distributing an Internet connection to one or more clients systems. For example, specific geographic locations in which an Internet access point provides public wireless broadband internet access to mobile visitors through a wireless LAN (WLAN) are commonly referred to as "hotspots." Therefore, users of third party client systems (i.e., client systems which are otherwise unaffiliated with the provider of the Internet access point), are able to access the Internet by establishing a connection with the Internet access point. The availability of Internet access, and particularly wireless hotspots, has become a selling point for many businesses, municipalities, airports, and the like.

However, many of the above mentioned Internet access point providers consider it important to monitor the identities of the individuals and client systems accessing the Internet via the providers' Internet access points. For example, the provider may be concerned with online security, and/or may wish to charge a fee to the users of their Internet access points. Because the provider of the Internet access point is typically charged a usage fee for the Internet connection by their Internet Service Provider (ISP), the Internet access point provider often passes this expense onto the end user.

Therefore, the provider often requires third party client systems connecting to their Internet access point to perform an authentication process, which may include the submission of a username, password, and other identification information. Where the provider of the Internet access point intends to charge a fee to the online users, the users are also required to submit billing information, such as credit card information, before access is granted.

However, many users are deterred from accessing the Internet via public Internet access points because they do not wish to share personal and confidential information each time they wish to access the Internet. Furthermore, when a user merely wishes to briefly access the Internet, the user often foregoes doing so because the process of authenticating with the Internet access point can be overly burdensome.

BRIEF SUMMARY OF THE INVENTION

These and other limitations are overcome by embodiments of the invention, which relate to systems and methods for authenticating users. One embodiment of the invention authenticates a third party client system prior to providing Internet access via an Internet access point to the third party client system. The method may be practiced, for example, in a distributed computing system including an Internet access point, an authentication service, and a third party client system. The method includes receiving at the authentication service an authorization request from the third party client system. The authorization request is initiated in response to a single action being performed by a user of the third party client system, wherein the user is not required to manually submit any identification information. The authorization request includes a unique client identifier for identifying the third party client system. The method also includes verifying that the third party client system associated with the unique client identifier is authorized to access the Internet via the Internet access point. If the third party client system is authorized to access the Internet, the method includes providing Internet access to the third party client system associated with unique client identifier via the Internet access point.

A further embodiment is directed to a method of requesting authorization to access the Internet via an Internet access point. The method may be practiced, for example, in a distributed computing system including an Internet access point, an authentication service, and a third party client system. The method includes providing a single action user interface on a display of the third party client system for receiving a single action from the user to initiate an authorization request for accessing the Internet via the Internet access point. The single action user interface does not request the manual submission of any identification information from the user. After receiving the single action from the user at the third party client system, an authorization request is sent to the authentication service, the authorization request including a unique client identifier for identifying the user of the third party client system. Finally, the method includes receiving at the third party client system authorization to access the Internet via the Internet access point.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF PREFERRED EMBODIMENTS

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention Embodiments of the present invention provide for an authentication service for providing Internet access to third party client systems via an Internet access point. The authentication service simplifies the authentication process that a user of a third party client system performs prior to being granted Internet access via the Internet access point. In particular, the authentication service provides a user interface which allows a user to authenticate and gain access to the Internet via the Internet access point by taking a single action, such as a mouse click. The single action authentication of the present invention reduces the number of user interactions needed to authenticate with a provider of an Internet access point and reduces the amount of personal and confidential information that is communicated between a client system and a server system.

Figure 1A:
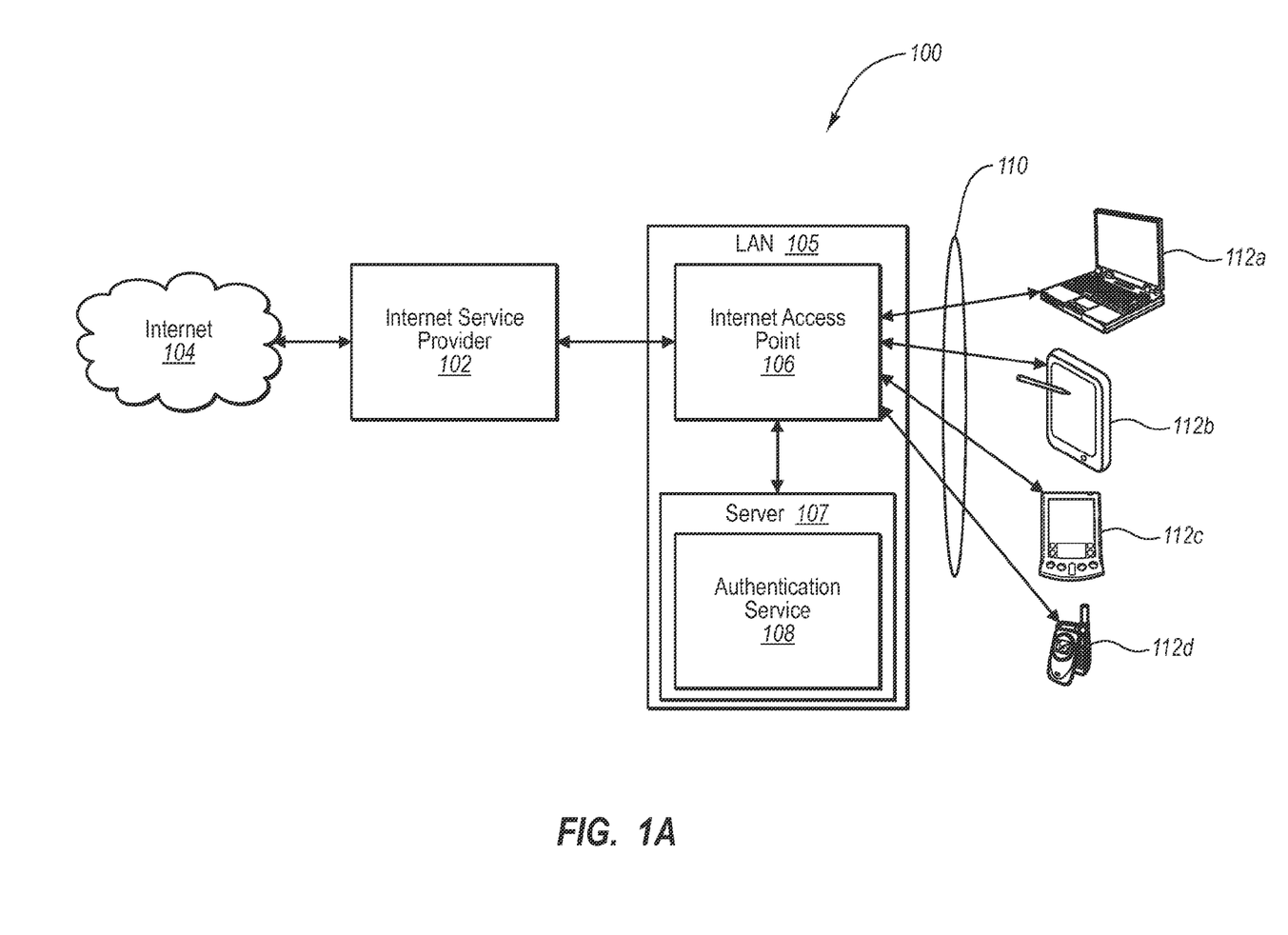
FIG. 1A illustrates a schematic drawing of a networking computer environment for providing single action authentication of a third party client system.

Referring now to FIG. 1A, a more detailed example will be illustrated using a diagrammed reference to a network computer environment 100. This embodiment supports single action authentication of a third party client system 112 for online access via an Internet access point 106. The network computer environment 100 includes a Local Area Network (LAN) 105 which connects to the Internet 104 via either a dial up or broadband connection. The LAN 105 may connect to the Internet 104 via an Internet Service Provider (ISP) 102. The LAN 105 may include an Internet access point 106 and an authentication service 108. The Internet access point 106 provides Internet access to one or more third party client systems 112a-112d. The third party client systems 112 authenticate via an authentication service 108 prior to gaining access to the Internet via the Internet access point 106.

The ISP 102 may include a business or organization that offers Internet access and related services to individuals and companies. The ISP 102 may provide either dial up or broadband service, including ISDN, Broadband wireless access, Cable modem, DSL, Satellite, Ethernet, and the like.

The features, geographic range, and complexity of the LAN 105 may vary greatly depending on the scope and type of services the LAN 105 is intended to provide. For example, the LAN 105 may simply include an Internet access point 106 for providing Internet access to a relatively small number of third party client systems 112. As illustrated in the embodiment of FIG. 1A, the LAN 105 may further include a server 107 which may include an authentication service 108. Conversely, the LAN 105 may include a large and complex computer network, such as a Metropolitan Area Network (MAN) spanning an entire city, and providing Internet access to third party client systems 112 located within the city via one or more Internet access points 106. Consequently, although the term "LAN" traditionally applies to small local areas, the term "LAN", as used herein, applies to any computer network which is capable of providing Internet access to third party client systems 112.

The LAN 105 provides Internet access to third party client systems 112 via Internet access point 106. The Internet access point 106 may include any portal for distributing an Internet connection to multiple third party client systems 112. For example, the Internet access point 106 may include a wireless router, a wired router, a Wireless Access Point (WAP), a network switch, a network bridge, an Ethernet hub, an Ethernet switch, and the like, or any combination thereof. Where the Internet access point 106 distributes a wireless signal, a "hotspot" is created, as described in the background section, allowing one or more third party clients 112 to wirelessly connect to the Internet. Furthermore, when the Internet access point 106 is configured to provide wireless access over a large geographic area, the Internet access point 106 may include several WAPs linked together to form a larger network that allows "roaming", and may further include repeaters and reflectors amplifying signals over a larger geographic area.

Therefore, the transmission medium 110 for communicating Internet data between the Internet access point 106 and one or more third party client systems 112 may include either a wireless or a wired connection. For example a wired connection may include an Ethernet cable, category 5 cable, 10BASE-T, 100BASE-TX, 1000BASE-T, and the like. Also, a wireless connection may include IEEE 802.11, Wireless Fidelity (WiFi), WiMAX, and the like.

As stated previously, the Internet access point 106 is configured for providing Internet access to one or more third party client systems 112. In general, a third party client system 112 is a computer system that is not owned, affiliated with, or otherwise controlled by the provider of the Internet access point 106. For example, the laptop (e.g., 112a) of a patron who connects to the Internet 104 via an Internet access point 106, provided by a cybercafé, would be considered a third party client system because, apart from accessing the Internet from the cyber café, the patron and the laptop are unaffiliated with the cybercafé. In other words, the laptop of the patron is not owned or controlled by the cybercafé. Conversely, the laptop of a homeowner who connects to the Internet via a wireless router in the homeowner's home would not be considered a third party client system, because the homeowner is the provider of the Internet access point (i.e., the wireless router), and also owns and controls the laptop. In one embodiment, a third party client system 112 is one which is charged a fee by the provider of the Internet access point 106 in order to gain access to the Internet 104 via the Internet access point 106

The third party client systems 112 include portable computer devices that may easily connect to and be removed from the LAN 105. Common examples of portable computer devices include laptop computers 112a, tablet computers 112b, personal digital assistants (PDAs) 112c, cellular telephones 112d, and the like or any combination thereof. When a reference is made herein to a "third party client system 112" without specifically identifying one of the third party client systems 112a, 112b, 112c, or 112d, the reference is to be interpreted as a generic third party client system, which may include any of the above examples.

The provider of the Internet access point 106 may include commercial and noncommercial businesses, organizations, or individuals. For example, providers may include cybercafés, coffee shops, municipalities, college campuses, hotels, public and private schools, places of business, bookstores, restaurants, airports, transit stations, and the like. Therefore, the users of the third party client systems 112 may include patrons, customers, clients, students, and the like, who visit the above locations.

Prior to allowing third party client systems 112 to access the Internet via an Internet access point 106, the provider of the Internet access point 106 oftentimes will require the third party client system 112 to authenticate itself by performing a login process. However, the login process often serves as a deterrent to many potential users, because many users feel that the login process is overly burdensome, and do not feel comfortable submitting personal and confidential information, such as credit card numbers, usernames, and passwords.

The present invention provides an authentication service 108 for facilitating access to the Internet via an Internet access point 106. In particular, the present invention provides for an authentication service 108 that allows a third party client system to be authenticated in response to a single action being performed by the user of the third party client system 112.

Figure 2:
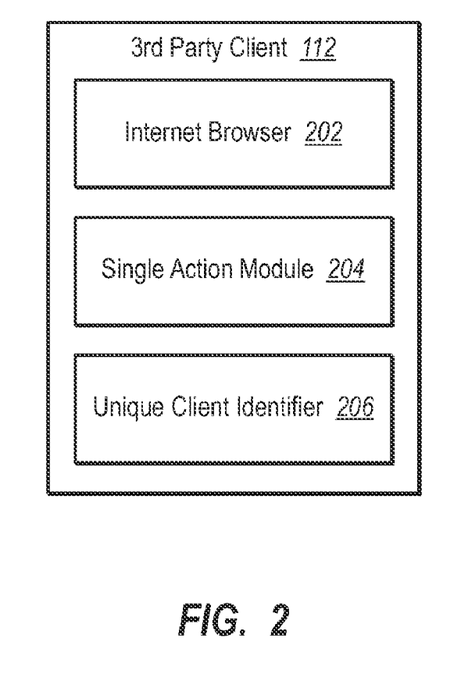
FIG. 2 illustrates a schematic drawing of a third party client system.

A more detailed illustration of a third party client system 112 is provided in FIG. 2. The third party client system 112 includes an Internet browser 202, and may also include a single action module 204 and a unique client identifier 206. As will be appreciated, the single action module 204 may include software modules that are installed locally on the third party client system 112 or may include web based programs that are uploaded to a third party client system 112 from the LAN 105 when the third party client system 112 attempts to access the Internet 104 via the Internet access point 106.

Figure 3:
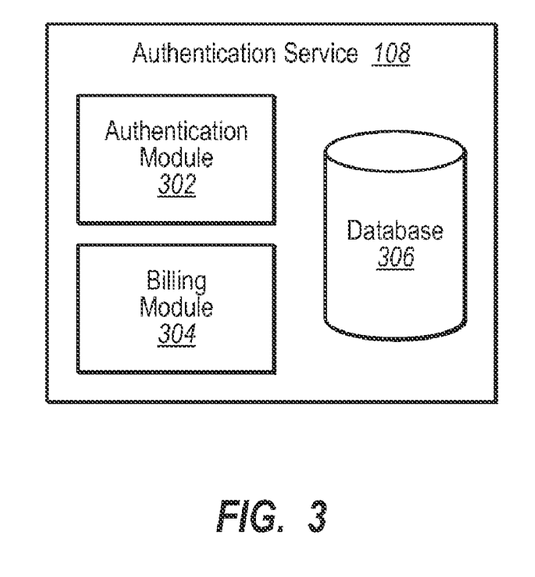
FIG. 3 illustrates a schematic drawing of an authentication service.

FIG. 3 provides a more detailed illustration of an authentication service 108. The authentication service 108 includes an authentication module 302 for receiving an authentication request from the third party client and for performing the authentication process, and a database 306 for storing account information about each third party client and/or each user that may be authorized to access the Internet 104 via the Internet access point 106. The authentication service 108 can further include a billing module 304 for managing the billing of users of the Internet access point 106.

Before a user of a third party client system 112 can perform a single action authentication process, as described in more detail below, the user first performs a one-time initiation session in order to provide the authentication service 108 with the account information necessary to perform a single action authentication. During the one time initiation session, the user of the third party client system 112 provides the authentication service 108 with information which may include the identity of the user, a username and password, user preferences, contact information for the user, and the like. In the event that the Internet access point 106 provides Internet access only to paying subscribers, the user may also be prompted to provide billing information, such as credit card numbers and expiration dates, bank account information, and the like. Furthermore, in the event that the Internet access point 106 is a pre-paid service, the user may also be prompted to submit a prepayment by credit card, bank account, or by a cash payment to an administrator. Payments may also be effectuated by an electronic money transmitter company, such as PayPal®, VeriSign®, and the like, for added security.

The authentication service 108 stores information received from the third party client system in the database 306, and assigns a unique client identifier 206 to the third party client system 112. If a prepayment was received from the user, the amount of the payment is added to the balance of the user's account, and is stored in the database 306. The server 107 sends the assigned unique client identifier 206 to the third party client system 112, which stores the unique client identifier 206 in a predefined location. For example, unique client identifier 206 may be stored in a "cookie" file on the third party client system 112. In one embodiment, during the one time initiation session, the user of the third party client system 112 may be prompted to install the single action module 204 locally at the third party client 112.

The single action authentication process may be initiated by a user of the third party client system 112 in a number of distinct ways, all of which fall within the scope of the present invention. In one embodiment, single action authentication is initiated simply by opening an Internet browser 202 on a third party client system 112. If the third party client system 112 has an established connection with the Internet access point 106 (either a wireless or wired connection), the Internet browser 202 will typically initiate an attempt to access Internet data via the Internet access point 106. When the Internet access point 106 detects that the unauthenticated third party client system 112 is attempting to access Internet data, the authentication service 108 is notified, and the authentication service invokes the single action module 204 on the third party client system 112. This can be performed either by initiating a program that was previously installed at the third party client system 112 or by causing a web page to appear at the third party client system 112. The single action module 204 consists of a single action user interface including a selectable icon or button that prompts the user of the third party client system 112 to select the icon or button. For example, The single action user interface may consist of a prompt, such as, "Press here to login to XYZ's wireless Internet access:", followed by a selectable icon, labeled "LOGIN", where "XYZ" is the name of the provider of the Internet access point 106.

Alternatively, instead of opening an Internet browser 202 to initiate the single action authentication process, the user of a third party client system 112 may open a single action module 204 that has previously been installed on the third party client system 112. For example, the single action module 204 may have previously been installed on the third party client system 112 during the one-time initiation session, described above. Upon opening the single action module 204, the single action user interface is displayed to the user, including a selectable icon, similar to that described above, allowing the user to initiate the authentication process by performing a single action such as a mouse click.

Although a "single action" may generally be a mouse click, various different single actions can be used to initiate the authentication process. For example, a single action may include a voice command, the compression of a key on a keyboard of the third party client system 112, and the like. Although a single action may be preceded by multiple physical movements of the user (e.g., moving a mouse so that a mouse pointer is over a button, positioning a microphone to receive a voice command, and the like), the single action generally refers to a single event received by a third party client system 112 from a user.

After completing the single action, the third party client system 112 submits an authorization or authentication request to the authentication service 108. As used herein, the terms "authentication request" and "authorization request"

may be used interchangeably. In one embodiment, the authentication request includes the submission of the unique client identifier 206 for identifying the third party client system 112 and/or identifying the user of the third party client system. The unique client identifier 206 may include an Internet Protocol address (IP address), a username, a password, a credit card number, a telephone number, an encrypted code, and the like, or any combination thereof. To reduce the chance of sensitive information being intercepted, the unique client identifier 206 may include only enough information so that the authentication service 108 can correctly identify the third party client system, but not enough information to be useful to an unscrupulous interceptor.

By completing the single action (e.g., a mouse click), the user of the third party client system 112 is not required to manually submit any identification information. Instead, the single action triggers a background program which automatically submits the authentication request to the authentication service 108. The single action authentication of the present invention reduces the number of user interactions needed to authenticate with a provider of an Internet access point, and reduces the amount of personal and confidential information that is communicated between a client system and a server system.

Upon receiving the authentication request from one of the third party clients 112, the authentication module 302 compares the authentication request information to the data previously stored in the database 306 during the one time initiation session to determine if the third party client system should be authorized to gain access to the Internet via the Internet access point 106. For example, the authentication module 302 may compare the unique client identifier 206 received from the third party client 112 to a list of unique client identifiers stored in the database 306 to determine if the third party client system associated with the received unique client identifier 206 has been registered with the authentication service 108.

If, based on the authentication request received from the third party client 112, the authentication module 302 determines that the third party client system 112 has the proper credentials to be authenticated, the authentication module 302 may transmit a message to the third party client system 112 to notify the user of the system that Internet access has been granted. The authentication service 108 then permits the third party client system 112 to access the Internet 104 via the Internet access point 106.

In the event that the Internet access point 106 is a pay service, the authentication module may also invoke the billing module 304. The billing module 304 ensures that sufficient billing information has been acquired regarding the user of the third party client system 112, and manages the billing of the user for the user's Internet access. For example, the billing module 304 may access payment information associated with unique client identifier 206 received from the third party client 112. The payment information may include credit card numbers and expiration dates, bank account numbers, account balances, remaining credit, Internet usage and billing information for previous billing cycles, and the like, or any combination thereof. The billing module 304 may further adjust the balance of the user's account, bill the user's credit card or bank account, or take other actions necessary to appropriately charge the user of the third party client system 112.

If, based on the authentication requests received from the third party client system 112, the authentication module 302 determines that a third party cannot be authenticated, the server 107 may notify the third party client system 112 that access to the Internet 104 via the Internet access point 106 has been denied. The server 107 may further provide a web page or other user interface to register the user (i.e, the one time initiation session, described above), or collect the additional information that is needed to authenticate the user.

The authentication service 108 can collect multiple unique client identifiers 206 for a single third party client system 112, where multiple users access the Internet 104 via the Internet access point 106 from the same third party client system 112. After two or more distinct users of a single third party client system 112 have registered with the authentication service 108 the authentication service 108 can allow the user of the third party client system 112 to identify themselves by selecting one of the users associated with a third party client system 112 prior to authenticating the user. In the case where more than one user is associated with a single third party client system 112, the authentication service may also require that the user of the third party client system submit a password or other authentication information prior to authenticating the user in order to provide an additional layer of security for each user of the third party client system 112.

As described previously, in the embodiment of FIG. 1A, the server 107 and authentication service 108 may be included as part of the LAN 105. In alternative embodiments, the server 107 need not be located at the site of the provider of the internet access point 106, and need not be controlled by the provider of the Internet access point 106. For example, the server 107 may be located at a remote location and may be operated and controlled by an independent provider of the authentication service 107.

Figure 1B:
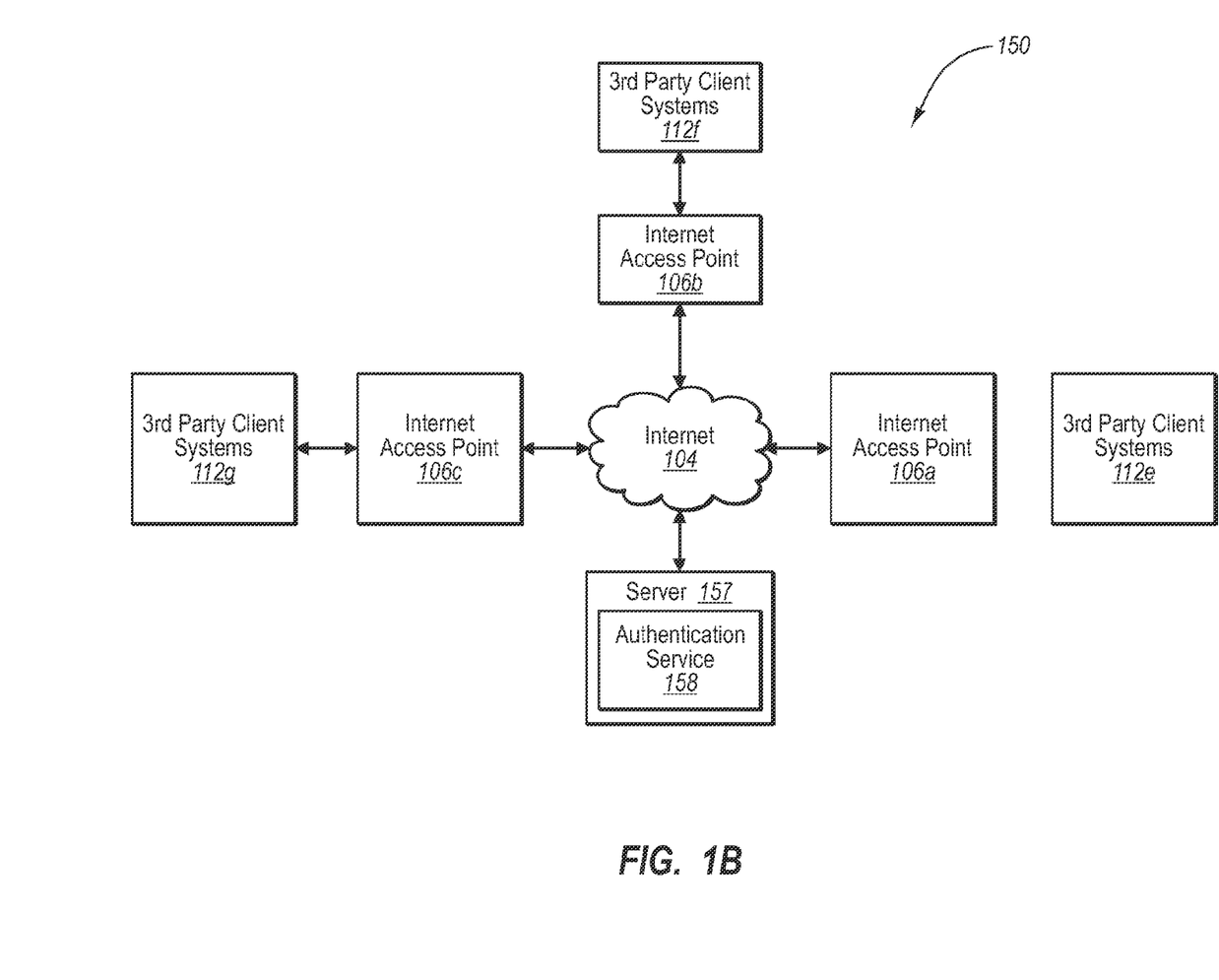
FIG. 1B illustrates a schematic drawing of another embodiment of a networking computer environment for providing single action authentication of a third party client system.

FIG. 1B illustrates one embodiment where a server 157 operates independently of a LAN and Internet access point 106, in contrast to the embodiment shown in FIG. 1A. In the FIG. 1B example, an authentication service 158 may act as a central repository containing account information for users of third party client systems 112*e*, 112*f*, and 112*g* accessing the Internet 104 via one or more Internet access points 106*a*, 106*b* and 106*c*. Each Internet access point 106 may be controlled by different providers. The providers of the Internet access points 106 may establish a relationship with the provider of the authentication service 158 where the authentication service 158 will manage the authentication of all users attempting to access the Internet 104 via the providers' internet access points 106.

Users can register with the authentication service 158 in a manner similar to the one-time initiation process described previously. After a user has registered with the authentication service 158, the user may be allowed to perform single-action authentication to access the Internet 104 via any Internet access point 106 that has a preexisting relationship with the authentication service 158. Upon performing the single action authentication, the user's request is communicated to the authentication service 158, which performs the determination of whether the user's third party client system 112 will be allowed to access the Internet 104 via one of the Internet access points 106. The determination of the authentication service 158 is then communicated back to the appropriate Internet access point 106, which then either grants or denies Internet access to the requesting third party client system 112.

The authentication service 158 may further manage the billing of the users of the third party client systems 112. In one embodiment, the users of the third party client systems 112 may be billed separately for each Internet access point 106 provider. In another embodiment, the users of the third party client systems 112 are billed once by the authentication service 158, and the authentication service 158 provides each provider of the Internet access points 106 with a share of the user's payment in accordance with the amount each providers Internet access point 106 has been used by the user, and in accordance with the billing rates of each individual provider.

The embodiment illustrated in FIG. 1B advantageously allows a user to perform a single registration process with the authentication service, which allows the user to access the Internet 104 via any Internet access point 106 having a pre-existing relationship with the authentication service 158. The present embodiment also relieves the providers of the Internet access points 106 from being required to monitor which users and third party client systems 112 are accessing the Internet 104 via their Internet access point 106, and from being required to manage the billing of users for their Internet usage.

Figure 4:
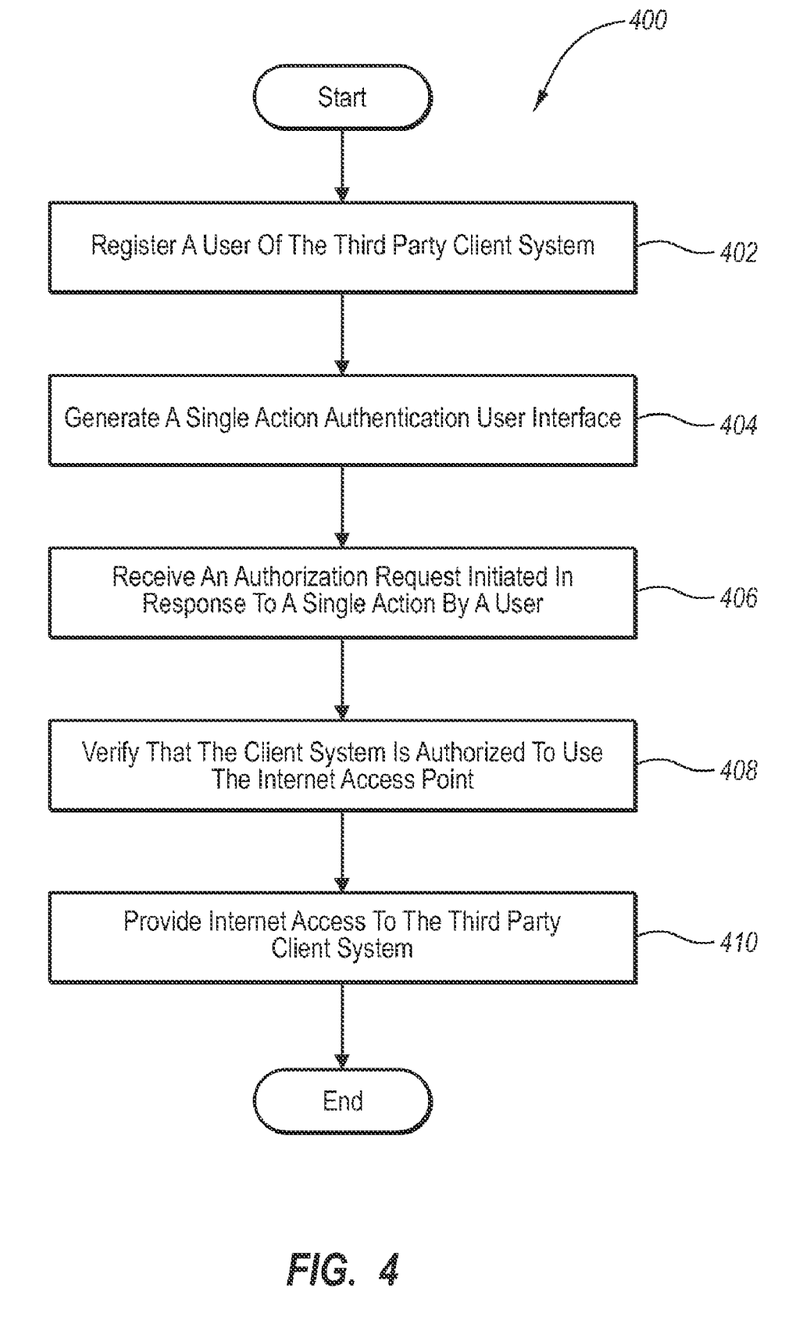
FIG. 4 illustrates a flow diagram for authenticating a third party client system.

Referring now to FIG. 4, a method 400 of authenticating a third party client system prior to providing Internet access via the Internet access point is illustrated. The method 400 may be practiced, for example, in a distributed computing system including an authentication service, a third party client system, and an Internet access point, which may include a wired or wireless access point. The method 400 may include registering 402 a user of the third party client system during a one time initiation session. The act of registering 402 the user of the third party client system may further include receiving account information from the user, such as billing information, a username and password, the IP address of the third party client system, contact information for the user, user preferences, and the like. Registering 402 the user may also include assigning a unique client identifier to the third party client system, and associating the unique client identifier with the account information received from the user. The unique client identifier and other account information may further be stored at the authentication service and at the third party client system. The unique client identifier may include the user's username, password, the third party client system's IP address, an encrypted code, and the like.

Referring once again to FIGS. 1A and 3, an illustrative example of a distributed computing system 100 and a detailed representation of an authentication service 108 are provided. A user of a third party client system 112 may register with the authentication service 108 during a one time initiation session. Following the registration of the user, the account information received from the user and the unique client identifier 206 may be stored in the database 306 at the authentication service 108.

Returning to FIG. 4, in one embodiment, the method 400 may also include generating 404 a single action user interface on the display of the third party client system for requesting a single action from the user for initiating the authentication process. For example, as illustrated in FIGS. 1A and 2, the single action module 204 may generate a user interface on the display of the third party client system 112, which requests a single action from the user. The single action module 204 may be a program that has previously been installed on the third party client system 112, or a program that is initiated remotely by the authentication service 108. The single action user interface may include, for example, a button or icon that may be selected by the user of the third party client system 112 for initiating the authentication process.

The method 400 may further include receiving 406 at the authentication service an authorization request from the third party client system. The authorization request is initiated in response to a single action being performed by a user of the third party client system without the manual submission of any identification information by the user. The authorization request includes a unique client identifier for identifying the third party client system. As illustrated in FIG. 1A, the authentication service 108 may receive an authentication request from a third party client system 112. The user of the third party client system 112 initiates the authentication request by performing a single action, such as a mouse click. Upon receiving the authentication request from the third party client system 112 at the Internet access point 106, the authentication request may be redirected to the authentication service 108, which manages the authentication process.

Referring once again to FIG. 4, the method 400 further includes verifying 408 that the third party client system associated with the unique client identifier is authorized to access the Internet via the Internet access point. For example, as illustrated in FIGS. 1A and 3, the authentication module 302 of the authentication service 108 may verify the credentials of the third party client system 112 associated with the received unique client identifier by comparing the received unique client identifier with a list of authorized unique client identifiers in the database 306.

If it is determined at 408 that the third party client system is authorized to access the Internet via the Internet access point, the method 400 further includes providing 410 Internet access to the third party client system via the Internet access point. Thus, as illustrated in the FIG. 1A example, the authentication service 108 allows the third party client system 112 associated with the unique client identifier to access the Internet 104 via the Internet access point 106.

The method 400 may further include billing the user of the third party client system a predefined amount for the Internet access via the Internet access point. As described above, the user of the third party client system may be billed by means of a credit card, a bank account, subtracting from a remaining balance, and the like.

The method 400 may further include receiving at the authentication service authentication requests from multiple third party client systems via two or more independent internet access points, and managing a verification process for each internet access point. As described previously in reference to FIG. 1B, the authentication service 158 may act as a repository of user account information for users accessing the Internet 104 via multiple Internet access points 106a, 106b, and 106c. The authentication service 158 may receive authentication requests from multiple third party client systems 112e, 112f and 112g via the internet access points 106a, 106b, and 106c, and may manage the verification process for each Internet access point 106.

Figure 5:
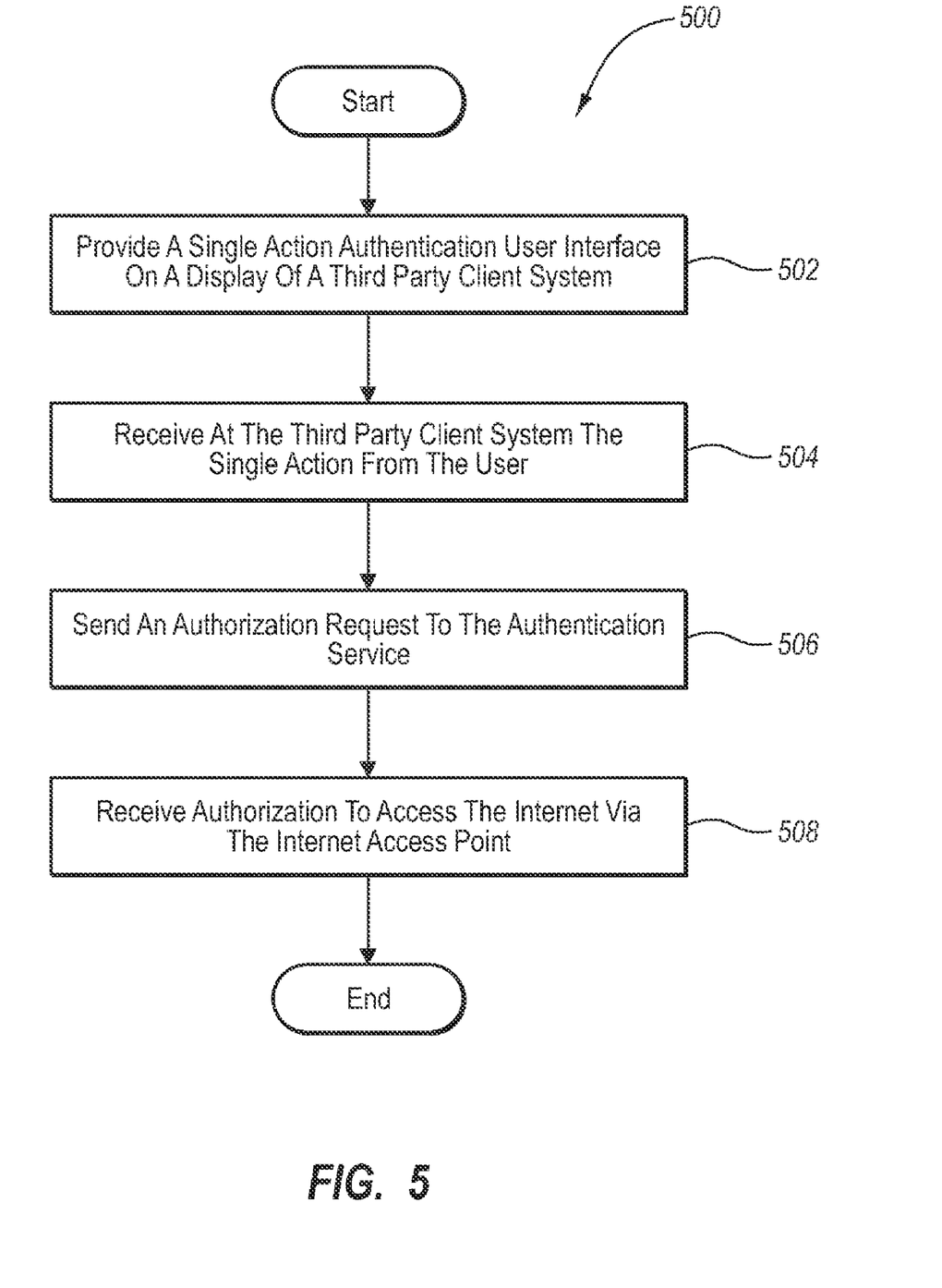
FIG. 5 illustrates a flow diagram for requesting authorization to access the Internet via an Internet access point.

Referring now to FIG. 5, a method 500 is illustrated of requesting authorization to access the Internet via the Internet access point. The method 500 may be practiced, for example, in a distributed computing system including an authentication service, a third party client system, and an Internet access point which may include a wired or wireless access point. The method 500 includes providing 502 a single action user interface on a display of the third party client system for receiving a single action from the user. The single action user interface does not request the manual submission of any identification information, such as username, password, or billing information, from the user. Referring again to FIGS. 1A and 2, the single action module 204 may cause the single action user interface to be displayed at the third party client system 112. The single action user interface may include a web page or other user interface for providing a user with a button or icon that when selected, initiates the authentication process.

The method 500 illustrated in FIG. 5 further includes receiving 504 at the third party client system the single action from the user. The single action may include a mouse click, a voice command, the selection of a key on a keyboard, and the like.

The method 500 also includes sending 506 an authorization request to the authentication service, including a unique client identifier for identifying the user of the third party client system. Referring again to FIGS. 1A and 3, the requesting third party client 112 may send the authorization request to the authentication service 108 through the Internet access point 106. Upon receiving the authentication request, the authentication service may verify the credentials of the third party client system 112. For example, the authentication service may compare the unique client identifier received from the third party client system 112 to a list of unique client identifiers stored at a database 306. If the authentication service 108 determines that the third party client system 112 has the proper credentials to be authenticated, the authentication module 204 transmits a message to the third party client system 112 to notify the user of the system that Internet access has been granted.

The method 500 may further include receiving 508 at the third party client system authorization to participate in an online session from the authentication service. Upon receiving the authorization from the authentication service, third party client system may proceed to access the Internet via the Internet access point.

The method 500 may further include sending account information to the authentication service during a one-time initiation session, such as a username, password, IP address, billing information, user preferences, and the like.

Embodiments herein may comprise a special purpose or general-purpose computer including various computer hardware, as discussed in greater detail below. A portable device is an example of a special purpose or a general-purpose computer. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computing system including one or more Internet access points, an authentication service, and a third party client system, a method of authenticating the third party client system prior to providing Internet access via one of the Internet access points to the third party client system, the method comprising:

receiving, at the authentication service, information regarding at least a user of the third party client system via private Internet access or a first Internet access point;

transmitting to the third part client a single action module, the single action module including mechanisms configured to allow the third party client to implement a single action initiation of Internet access, the single action module being directly provided by the authentication service to the third party client;

transmitting a unique client identifier to the third party client system by the authentication service in response to receiving the information;

storing, at the authentication service, at least part of the information;

receiving, at the authentication service, subsequent to transmitting the unique client identifier to the third party client system, an authorization request from the third party client system via a second Internet access point, the authorization request being initiated in response to a single action being performed by a user of the third party client system without the manual submission of any identification information by the user, the authorization request including the unique client identifier for identifying the third party client system;

verifying that the third party client system associated with the unique client identifier is authorized to access the Internet via one of the Internet access points; and providing Internet access to the third party client system associated with unique client identifier via one of the Internet access points.

2. The method as recited in claim 1, wherein the single action is a mouse click.

3. The method as recited in claim 1, further comprising billing the user of the third party client system a predefined amount for the Internet access.

4. The method as recited in claim 1, further comprising:

receiving at the authentication service account information from the user of the third party client system during a one time initiation session;

assigning the unique client identifier to the third party client system for identifying the third party client system;

associating the unique client identifier with the account information; and storing the unique client identifier at the authentication service and at the third party client system.

5. The method as recited in claim 4, wherein the account information includes billing information for the user of the third party client system.

6. The method as recited in claim 1, wherein the unique client identifier includes a username.

7. The method as recited in claim 1, wherein the unique client identifier includes an Internet Protocol address of the third party client system.

8. The method as recited in claim 1, wherein the Internet access point is a wireless Internet access point.

9. The method as recited in claim 1, wherein receiving an authorization request more specifically comprises:
receiving the authorization request at the Internet access point; and
redirecting the authorization request to the authentication service.

10. The method as recited in claim 1, further comprising generating a single action user interface on the display of the third party client system for requesting the single action from the user.

11. The method as recited in claim 1, further comprising:
receiving at the authentication service authorization requests from multiple third party client systems via two or more independent internet access points; and
managing a verification process for each internet access point.

12. In a distributed computing system including an Internet access point, an authentication service, and a third party client system, a method of requesting authorization to access the Internet via the Internet access point, the method comprising:
receiving a unique client identifier at the third party client system from the authentication service, the unique client identifier provided by the authentication service in response to receiving information regarding at least a user of the third party client system;
receiving at the third party client system from the authentication system, subsequent to receiving the unique client identifier, a single action module, the single action module including mechanisms configured to allow the third party client to implement a single action initiation of Internet access the single action module being directly provided by the authentication service to the third party client;
providing, subsequent to receiving the single action module, a single action user interface based on the mechanisms of the single action module on a display of the third party client system for receiving a single action from the user to initiate an authorization request for accessing the Internet via the Internet access point, wherein the single action user interface does not request the manual submission of any identification information from the user;
receiving at the third party client system the single action from the user;
communicating an authorization request to the authentication service via the Internet access point, the authorization request including the unique client identifier for identifying the user of the third party client system; and
receiving at the third party client system authorization to access the Internet via the Internet access point.

13. The method as recited in claim 12, the method further comprising sending account information to the authentication service during a one-time initiation session.

14. The method as recited in claim 13, wherein the account information includes billing information for the user.

15. The method as recited in claim 12, wherein the single action is a mouse click.

16. The method as recited in claim 12, wherein the unique client identifier includes a username.

17. The method as recited in claim 12, wherein the unique client identifier includes an Internet Protocol address of the third party client system.

18. The method as recited in claim 12, wherein the Internet access point is a wireless Internet access point.

19. The method as recited in claim 12, further comprising receiving data from the authentication service for generating the single action user interface on the display of the third party client system for requesting the single action from the user.

20. In a distributed computing system including an Internet access point, an authentication service, and a third party client system, a method of authenticating the third party client system prior to providing Internet access via the Internet access point to the third party client system, the method comprising:
receiving at the authentication service account information from a user of the third party client system during a one time initiation session;
assigning a unique client identifier to the third party client system for identifying the third party client system in response to receiving the account information, and associating the unique client identifier with the account information;
transmitting the unique client identifier to the third party client system by the authentication service;
storing the unique client identifier at the authentication service and at the third party client system;
transmitting to the third part client a single action module, the single action module including mechanisms configured to allow the third party client to implement a single action initiation of Internet access, the single action module being directly provided by the authentication service to the third party client;
receiving at the authentication service, subsequent to transmitting the unique client identifier to the third party client system, an authorization request from the third party client system via one of the Internet access points, the authorization request being initiated in response to a single action being performed by a user of the third party client system without the manual submission of any identification information by the user, the authorization request including the unique client identifier;
verifying that the third party client system associated with the unique client identifier is authorized to access the Internet via the Internet access point; and
providing Internet access to the third party client system via the Internet access point.

\* \* \* \* \*